US009503487B2

(12) United States Patent
Paz et al.

(10) Patent No.: US 9,503,487 B2
(45) Date of Patent: Nov. 22, 2016

(54) CALL COUPLING

(71) Applicant: Cell Buddy Network Ltd., Tel Aviv (IL)

(72) Inventors: Ofir Paz, Rishon LeZion (IL); Erez Doron, Tel Aviv (IL); Simcha Aronson, Ra'anana (IL)

(73) Assignee: CELL BUDDY NETWORK LTD., Tel Aviv (IL)

( * ) Notice: Subject to any disclaimer, the term of this patent is extended or adjusted under 35 U.S.C. 154(b) by 0 days.

(21) Appl. No.: 14/820,106

(22) Filed: Aug. 6, 2015

(65) Prior Publication Data
US 2016/0044067 A1    Feb. 11, 2016

Related U.S. Application Data

(60) Provisional application No. 62/033,652, filed on Aug. 6, 2014.

(51) Int. Cl.
| | |
|---|---|
| H04W 4/16 | (2009.01) |
| H04L 29/06 | (2006.01) |
| H04M 3/54 | (2006.01) |
| H04M 15/00 | (2006.01) |
| H04W 76/02 | (2009.01) |

(52) U.S. Cl.
CPC .......... H04L 65/1069 (2013.01); H04M 3/54 (2013.01); H04M 15/56 (2013.01); H04W 4/16 (2013.01); H04W 76/023 (2013.01)

(58) Field of Classification Search
CPC ... H04W 8/14; H04W 4/026; H04W 72/048; H04W 4/12; H04W 8/22; G06F 21/30; H04M 19/08; H04M 3/54; H04M 1/03; H04M 3/46
USPC .......................... 455/406, 413, 414.1, 552.1
See application file for complete search history.

(56) References Cited

U.S. PATENT DOCUMENTS

| | | | | |
|---|---|---|---|---|
| 9,179,011 B1 * | 11/2015 | Newman | ............... | H04M 19/08 |
| 2014/0364090 A1 * | 12/2014 | Frager | .................... | H04W 4/12 |
| | | | | 455/413 |

* cited by examiner

Primary Examiner — Phuoc H Doan
(74) Attorney, Agent, or Firm — A.C. Entis-IP Ltd.

(57) ABSTRACT

A method for establishing for a first smartphone a phone connection with a second smartphone, each smartphone comprising a phone and running a software application ("app"), the method comprising: exchanging, by operating the app, at least one permission message between the first and second smartphones; transmitting a first identifier from the first smartphone and a second identifier from the second smartphone to a call connector, responsive to a successful exchanging of the at least one permission message; and connecting a first phone call and a second phone call to establish a phone connection between the first and second smartphones, if the first phone call matches the first identifier and the second phone call matches the second identifier.

23 Claims, 4 Drawing Sheets

CALL COUPLING

RELATED APPLICATIONS

The present application is a US National application, which claims the benefit of under 35 U.S.C. §119(e) of U.S. Provisional application 62/033,652 filed on Aug. 6, 2014.

FIELD OF INVENTION

Embodiments of the invention relate to a method of establishing a phone connection.

BACKGROUND

A phone communications network ("phone network") is established, operated and maintained by a "network operator" that provides a full duplex voice communication service between communication devices (hereinafter a "phone"), optionally in a geographically localized service area. The phones may be stand-alone devices, but may also be functionally connected with, or be comprised in, a computing device, such as by way of example a smartphone, a laptop, tablet, a desktop computer, or personal digital assistant (PDA). For convenience of presentation, unless specified otherwise, any combination of a phone functionally connected with a computing device may be referred to herein as a "smartphone".

The phone network may operate through a circuit switched network (CSN), which connects to wider telephony networks through the public switched telephone network (PSTN). Alternatively, the phone network may operate through a packet-switched network (PSN), which may connect to the internet. Voice calls made through the PSN are referred to generically as voice-over-internet-protocol ("VoIP") calls.

The phone network may be a cell-phone network, and the phone may be a cell-phone. Each cell-phone may connect through a base transceiver station ("BTS") to a "core network", which may include a CSN for handling voice calls, and a PSN for handling data and/or VoIP calls. For CSN-based communication beyond the core network, one or more BTSs of a network are further connected to wider telephony networks through the PSTN. For PSN-based communication beyond the core network, one or more BTSs of a network are further connected to the internet.

To use the services of a phone network with a phone, a phone's user enters into a contract directly or indirectly with the network operator that defines terms of a "service plan", such that an operating phone is "subscribed to" the network operator with which the user has a contractual relationship.

Phone calls typically "originate" from a first phone which is a "calling party" that "initiates" the phone call, which "terminates" at a second phone, a "called party", that receives the call.

There are various fees that are incurred in establishing a phone connection. One example of such a fee is a "termination fee", which one network charges to other network operators for terminating calls on its network. As a result, phone calls between phones that are subscribed to different network operators tend to, but not necessarily, be more expensive than calls between phones subscribed to the same network operator, which typically do not incur a termination fee. For convenience of presentation, a call between phones subscribed to the same network operator, and thus has no termination fee incurred, may be referred to herein as an "in-network call", and a call between phones subscribed to different network operators that incurs a termination fee may be referred to herein as an "out-of-network call". A common example of an out-of-network call is an international call. Where multiple networks serve a single locality, even phone calls between users located in the same city or neighborhood may be an out-of-network call. Such a situation is common with cell phones, where multiple competing networks serve users in overlapping locations. Typically, VoIP providers offer free calls, also referred to herein as in-network calls, between callers subscribed to the same VoIP provider. However, a termination fee is typically incurred with calls, also referred to herein as out-of-network calls, that are initiated as VoIP calls and are terminated at a PSTN-based phone. In such out-of-network VoIP calls, voice data traverses a "VoIP gateway" that serves as an interface between the PSN where the call is initiated and the CSN where the call terminates. However, in certain cases, for example due to promotional discounts, an out-of-network call may cost less than an in-network call.

Depending on individual network operators, the competitive environment between the network operators, the presence of promotional discounts, and local laws, phone connection fees can substantially increase the cost of phone communication, and the price of a phone call can vary widely depending on how the phone connection is established.

SUMMARY

An aspect of an embodiment of the invention is to provide a "call coupling" method for establishing a phone connection between a first and a second phone, wherein the first and second phones initiate first and second phone calls, respectively, to a common destination, referred to herein as a "call connector", with the call connector connecting the two incoming phone calls to establish the phone connection between the first and second phones.

According to an embodiment of the invention, the first and second phone calls by the first and second phones, respectively, are coordinated through a software application (a "TalkApp") that is functionally connected with each phone, respectively. The TalkApp may be installed in a smartphone that is also able to run the TalkApp software. In addition, the smartphone may be equipped to communicate with other computer devices, by way of example another smartphone, over long distances through an auxiliary communication channel (ACC), which may operate through a non-voice communication protocol, for example an internet protocol, USSD protocol or SMS protocol. As such, the TalkApps in different smartphones may communicate with each other using the ACC without forming a phone connection.

According to an embodiment of the invention, the call coupling procedure comprises at least one communication between a first smartphone and a second smartphone through a TalkApp that is installed in each phone. In certain embodiments of the invention, a first user operates the TalkApp in the first smartphone to send a request to the second smartphone to form a phone connection between them. If the second user, through operating the TalkApp, accepts the request, then each TalkApp instructs each phone incorporated in the respective smartphones to initiate a call to a common call connector. In accordance with an embodiment of the invention, after the second user accepts the request and before the smartphone calls are initiated, the TalkApps installed in one or both smartphones send connection instructions comprising identifying information for the expected phone calls to a computer system (hereinafter "connector control system" or "CCS") operatively connected to the call connector. Optionally, connection instructions are transmitted from a TalkApp in at least one of the smartphones to the CCS through the ACC. Using the information provided by the connection instructions, the call connector stands ready to connect the incoming calls from the first and second phones to form a phone connection.

According to an embodiment of the invention, each of the phone calls made by the first and second smartphones in the call coupling procedure is an in-network call. The call connector may optionally be subscribed to the same network operator as one, both or neither of the smartphones. Optionally, one or both of the smartphones may initiate an in-network call to a forwarding unit (CFU) subscribed to the same network operator, which then forwards the call so that the call terminates at the call connector that is subscribed to a different network operator. Therefore, in accordance with an embodiment of the invention, even when two smartphones subscribed to different networks establish a phone connection through the call coupling procedure, the phone connection between them is made by each smartphone making an in-network call, so that each caller avoids incurring an out-of-network termination fee.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
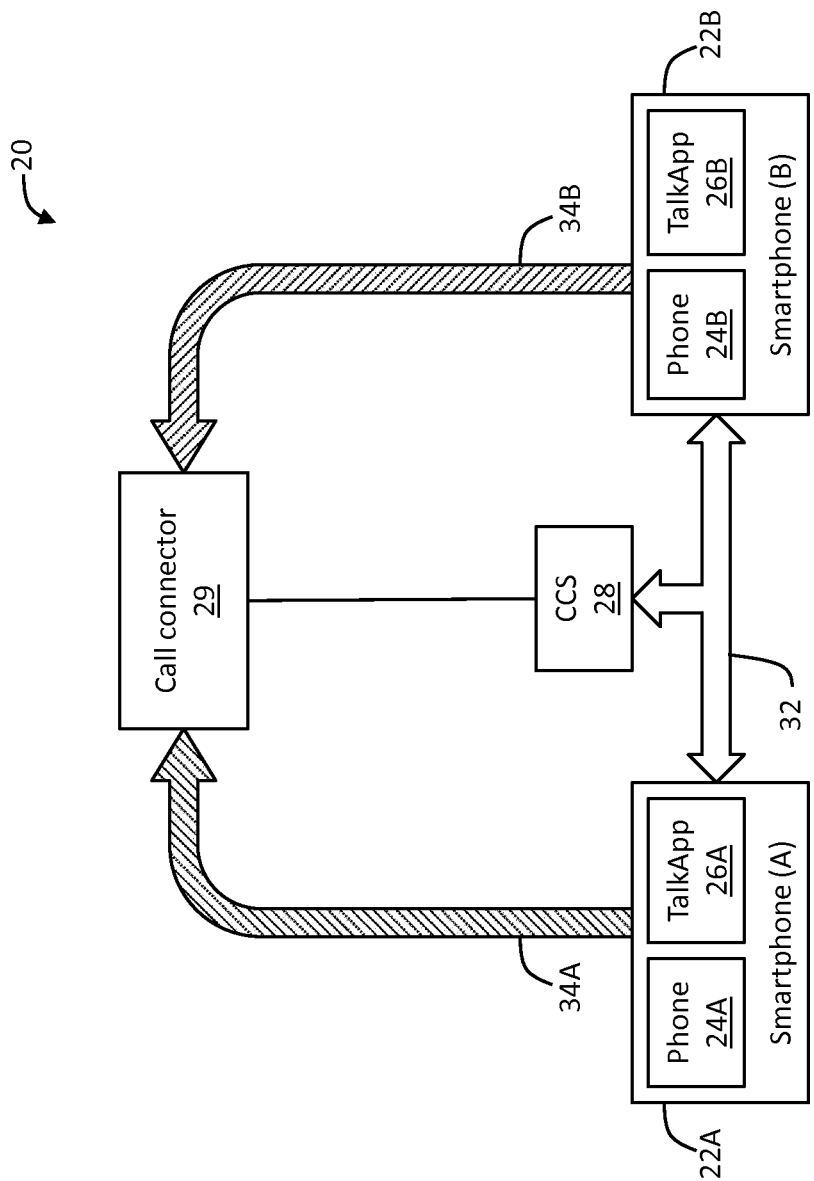
FIG. 1A shows a block diagram of a call coupling system, in accordance with an embodiment of the invention.

FIG. 1A shows a block diagram of a call coupling system 20, in accordance with an embodiment of the invention. In an embodiment of the invention, call coupling system 20 comprises a CCS 28 and a call connector 29 that is operatively connected to a CCS 28. Optionally, the call coupling system comprises a first smartphone (A) 22A and a second smartphone (B) 22B. Call connector 29 is optionally a CSN-based PBX (private branch exchange) or a PSN-based IP network server. Each smartphone comprises a phone and a TalkApp, so that smartphone 22A comprises a phone 24A and a TalkApp 24A and smartphone 22B comprises a phone 24B and a TalkApp 26B. User A (not shown) operates smartphone 22A and user B (not shown) operates smartphone 22B. In FIG. 1A, each smartphone is shown to be already loaded with the TalkApp. The TalkApp may be available for download through the internet in "App stores". Alternatively, the TalkApp may be pre-loaded in the smartphone.

In an embodiment of the invention, TalkApp 26A is operable to communicate with TalkApp 26B through an ACC, schematically represented by block arrow 32, in order to confirm permissions from each of users A and B to establish a phone connection between smartphones 22A and 22B through a call coupling procedure, which is described in further detail hereinbelow with reference to FIGS. 2A-2B. After permissions are confirmed, the respective TalkApps further communicate through the ACC with each other in order to control each phone in the respective smartphones to initiate a phone call to call connector 29. The phone call initiations by the smartphones are coordinated by the TalkApps so that the phone calls terminate at call connector 29 within a predetermined and overlapping time window. Also after permission confirmation, and before the phone calls to call connector 29 are initiated, at least one TalkApp communicates through ACC 32 with CCS 28 connected to call connector 29, in order to instruct call connector 29 to connect the incoming phone calls from the coordinated smartphones to each other so that a phone connection is established between the coordinated smartphones. The phone communication channel between smartphone 22A and call connector 29 is schematically represented by hatched arrow 34A, and the phone communication channel between smartphone 22B and call connector 29 is schematically represented by hatched arrow 34B.

Figure 1B:
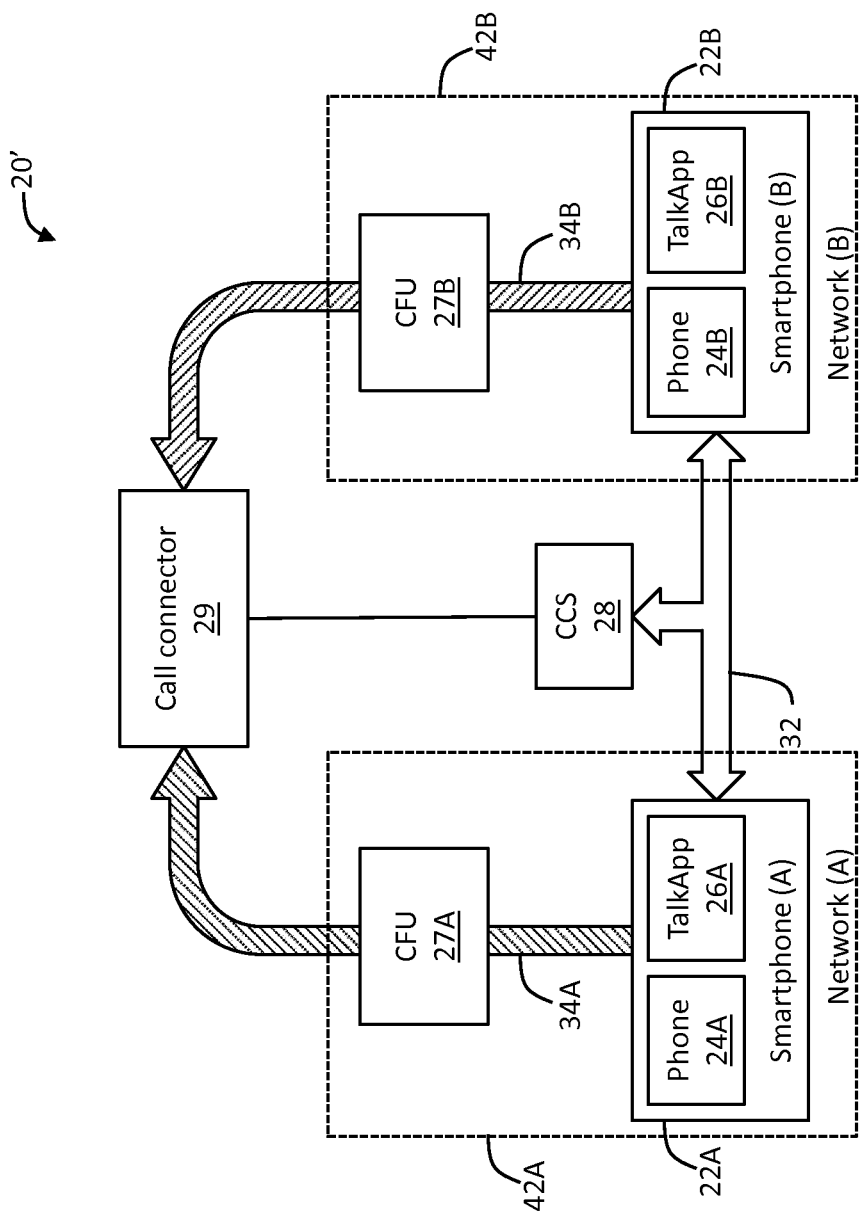
FIG. 1B shows a block diagram of a call coupling system with smartphones located in different localities, in accordance with an embodiment of the invention.

In an embodiment of the invention, the phone calls initiated by phones 24A and 24B may terminate directly at call connector 29. Alternatively, as shown in FIG. 1B that shows an alternative call coupling system 20', one or both of phones 24A and 24B may initiate an in-network phone call that terminates at a CFU subscribed to the same network operator as the phone, which then forwards the call to terminate at call connector 29 that may be subscribed to a different network operator. The CFUs are schematically represented as icons 27A and 27B.

Optionally, as shown in FIG. 1B, one or both of phones 24A and 24B may initiate an in-network phone call that terminates at a CFU subscribed to a same network operator as the phone, which then forwards the call to terminate at call connector 29 that may be subscribed to a different network operator. A phone network (A) operated by the network operator that phone 24A and CFU 27A are subscribed to is schematically represented as a dashed box 42A. A phone network (B) operated by the network operator that phone 24B and CFU 27B are subscribed to is schematically represented as a dashed box 42B. Call connector 29 may optionally be subscribed to phone network 42A, 42B, or a third phone network (not shown) different from phone networks 42A and 42B.

Optionally, one or both phones 24A and 24B may initiate a call to a particular CFU that belongs to a different network operator, such that one or both the phone calls initiated from the phones to the respective corresponding CFU is an out-of-network phone call.

Depending on various conditions, such as by way of example a particular network operator that a given phone 24A and/or 24B is subscribed to, the presence of promotional discounts, and agreements between various network operators, each of phones 24A and 24B initiating a call to their respective CFU 27A and 27B subscribed to the same network operator may not necessarily result in the least costly phone connection. In an embodiment of the invention, the TalkApp and/or the CCS may comprise a "price optimizing engine" (not shown). The price optimization engine may optionally select a particular call connector out of a plurality of call connectors for forming a least costly phone connection between smartphone 24A and smartphone 24B, and provide an appropriate access phone number for the respective smartphones to initiate a phone call to the selected call connector. Additionally or alternatively, the price optimization engine may select, for each phone 24A and 24B, a particular respective CFU out of a plurality of CFUs for forming a least costly phone connection between phone 24A and phone 24B, and provide an appropriate phone number for each smartphone to initiate a phone call to the selected CFU. In an embodiment of the invention, the access phone number provided to phone 24A and 24B may be different, by way of example, so that each phone may initiate an in-network phone call to call the respective selected CFU or call connector even when each of phones 24A and 24B are registered to a different network operator. The price optimizing engine may make the selection of the CFU or the call connector responsive to the network operator to which each smartphone is registered with, or with a location of one or both of the smartphones as determined by, by way of example, cell phone tower triangulation or GPS.

Optionally, the price optimizing engine may prescribe that a lower price would be achieved if one or both of phones 24A and 24B do not initiate a phone call. By way of example, the price optimizing engine may determine that it is preferable for phone 24A to call a given call connector 29, and for the given call connector 29 to call phone 24B.

In certain embodiments of the invention, the CFU may be a "VoIP gateway" that interfaces to both IP networks and a PSTN, and converts CSN-based calls to VoIP calls.

Figure 2A:
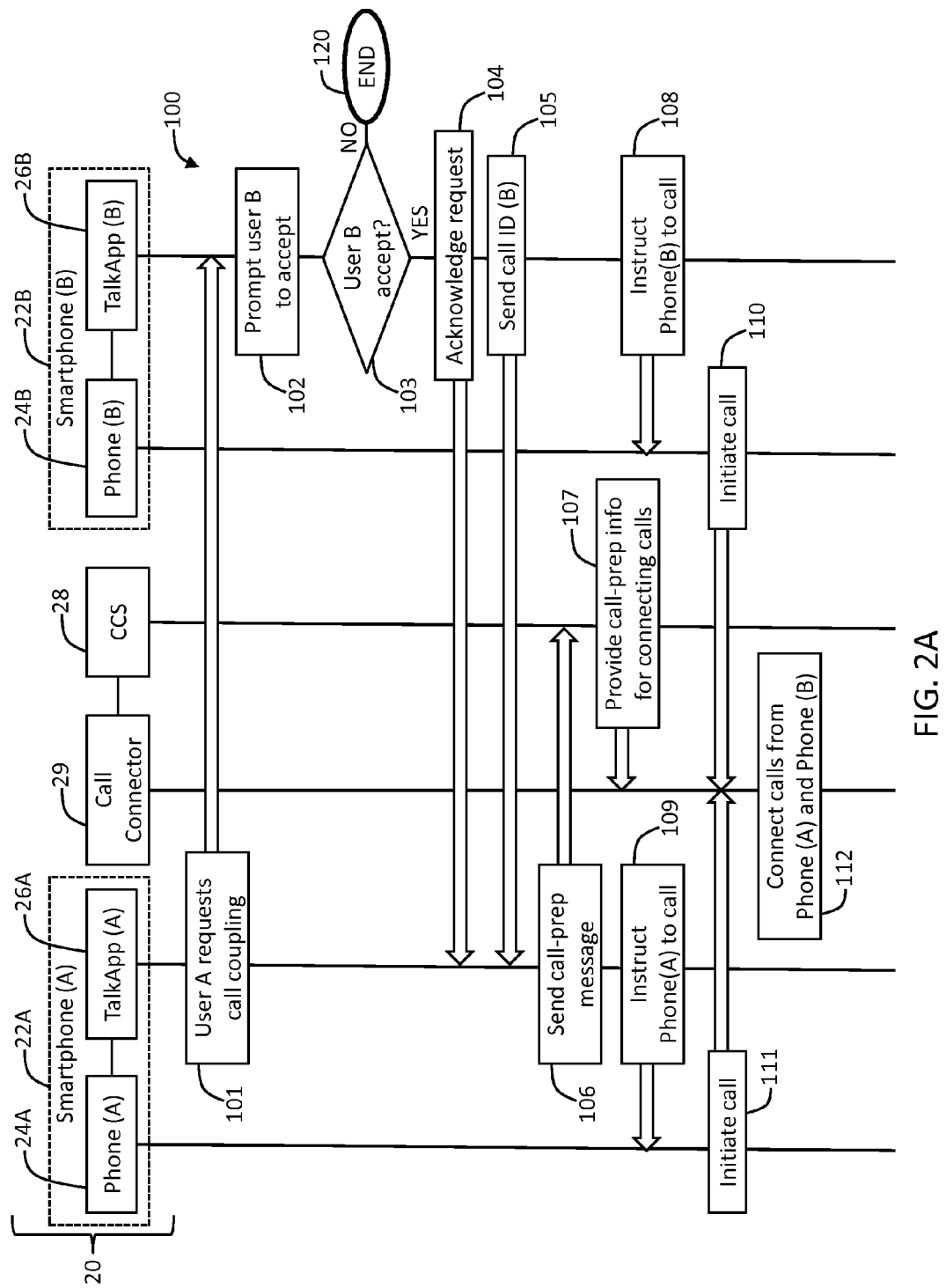
FIG. 2A shows a schematic flow diagram of a call coupling procedure in accordance with an embodiment of the invention.

FIG. 2A shows a schematic flow diagram 100 of a call coupling procedure provided by call coupling system 20 shown in FIGS. 1A and 1B, in accordance with an embodiment of the invention. Phone 24A, phone 24B, TalkApp 26A, TalkApp 26B, CCS 28 and call connector 29 are each appended with a vertical activity line along with their respective activities and statuses are indicated during performance of the call coupling procedure 100. In an embodiment of the invention, communication between TalkApp 26A, TalkApp 26B and CCS 28 is via an ACC (by way of example ACC 32 shown in FIGS. 1A and 1B).

In a block 101, user A (not shown) operates TalkApp 26A loaded on his or her smartphone 22A to request a phone connection with smartphone 22B operated by user B (now shown). In a block 102, in response to the request from TalkApp 26A, TalkApp 26B controls smartphone 22B to prompt user B to accept the request. In a decision block 103, user B determines whether or not to accept the request. The prompt to user B may optionally be in the form of one or a combination audio, visual and vibration outputs from the smartphone. In certain embodiments, the prompt may be substantially similar to receiving a phone call, such as producing a ringtone and presenting icons on a touchscreen of the smartphone designated for accepting or declining the request.

If user B does not accept the request, user B operates smartphone 22B to respond to the request for the phone connection and indicate that he or she does not wish to establish a phone connection with user A, and call coupling procedure 100 proceeds to a block 120 and ends. To decline the request, user B may optionally manipulate a touchscreen icon or a smartphone button (not shown) designated by TalkApp 26B for declining the request. TalkApp 26B may optionally determine that user B does not wish to establish a phone connection if user B does not respond to the request beyond a determined time limit.

If in decision block 103 user B determines to accept the request to establish a phone connection, user B operates smartphone 22B to indicate the request is accepted. To accept the request, user B may optionally manipulate a touchscreen icon or a smartphone button (not shown) designated by TalkApp 26B for accepting the request. In response to the acceptance of the request, TalkApp 26B initiates a phone call procedure in smartphone 22B as well as transmit an instruction back to TalkApp 26A that initiates the phone call procedure in smartphone 22A. The phone call procedure, in accordance with an embodiment of the invention, comprises the respective TalkApps 26A and/or 26B providing preparatory information ("call-prep info") to CCS 28 allowing it to operate call connector 29 to be able to subsequently connect phone calls received from phones 24A and 24B, followed by phones 24A and 24B calling call connector 29.

In an embodiment of the invention, in a block 104 further following user B's acceptance of the request, TalkApp 26B optionally transmits, via the ACC, an acknowledgement of the request 104 back to TalkApp 26A. In a block 105, TalkApp 26B optionally further transmits back to TalkApp 26A a "call ID" of phone 24B, which is an identifier for the phone call that phone 24B will subsequently make to call connector 29. In a block 106, in response to receiving acknowledgement 104, and phone 24B's call ID 105, TalkApp 26A optionally transmits via the ACC to CCS 28, in a block 106, a "call-prep message" that provides the call-prep info that prepares call connector 29, in a block 107, to connect the phone calls that will be directed to it subsequently from phones 24A and 24B. In accordance with an embodiment of the invention, the call-prep message comprises phone 24A's call ID (A), phone 24B's call ID (B) and a notification that incoming phone calls terminating at call connector 29 corresponding to the respective call IDs for phone 24A and phone 24B are to be connected. Optionally, the call ID comprises a phone number of phone 24A and phone 24B. Optionally, the call ID comprises a phone number provided to phone 24A and/or 24B by a price optimizing engine. In response to receiving the call-prep message, in a block 107, CCS 28 provides the call-prep info to call connector 29.

It will be appreciated that the procedure of providing the call-prep message 106 to CCS 28 is not limited to the above-described sequence. In an alternative sequence (not shown), TalkApp 26A, in response to receiving acknowledgement 104, may transmit phone 24A's call ID (A) to TalkApp 26B, which then transmits the call-prep message 106 to CCS 28. In another alternative sequence, TalkApp 26A may transmit phone 24A's call ID (A) to TalkApp 26B together with the request for call coupling 101, and TalkApp 26B transmits the call-prep message to CCS 28B following user B's acceptance of the call coupling request at decision block 103.

Further in response to user B's determination to accept the request to establish a phone connection, in blocks 108 and 109, each of TalkApps 26A and 26B instruct, respectively, phones 24A and 24B to initiate a phone call. In response to the respective instructions, in blocks 110 and 111, each of phones 24A and 24B initiates the phone call to call connector 29. In a block 112, call connector 29, in accordance with the call-prep info 107 provided by CCS 28, then connects the phone calls to establish a phone connection between phones 24A and 24B.

Figure 2B:
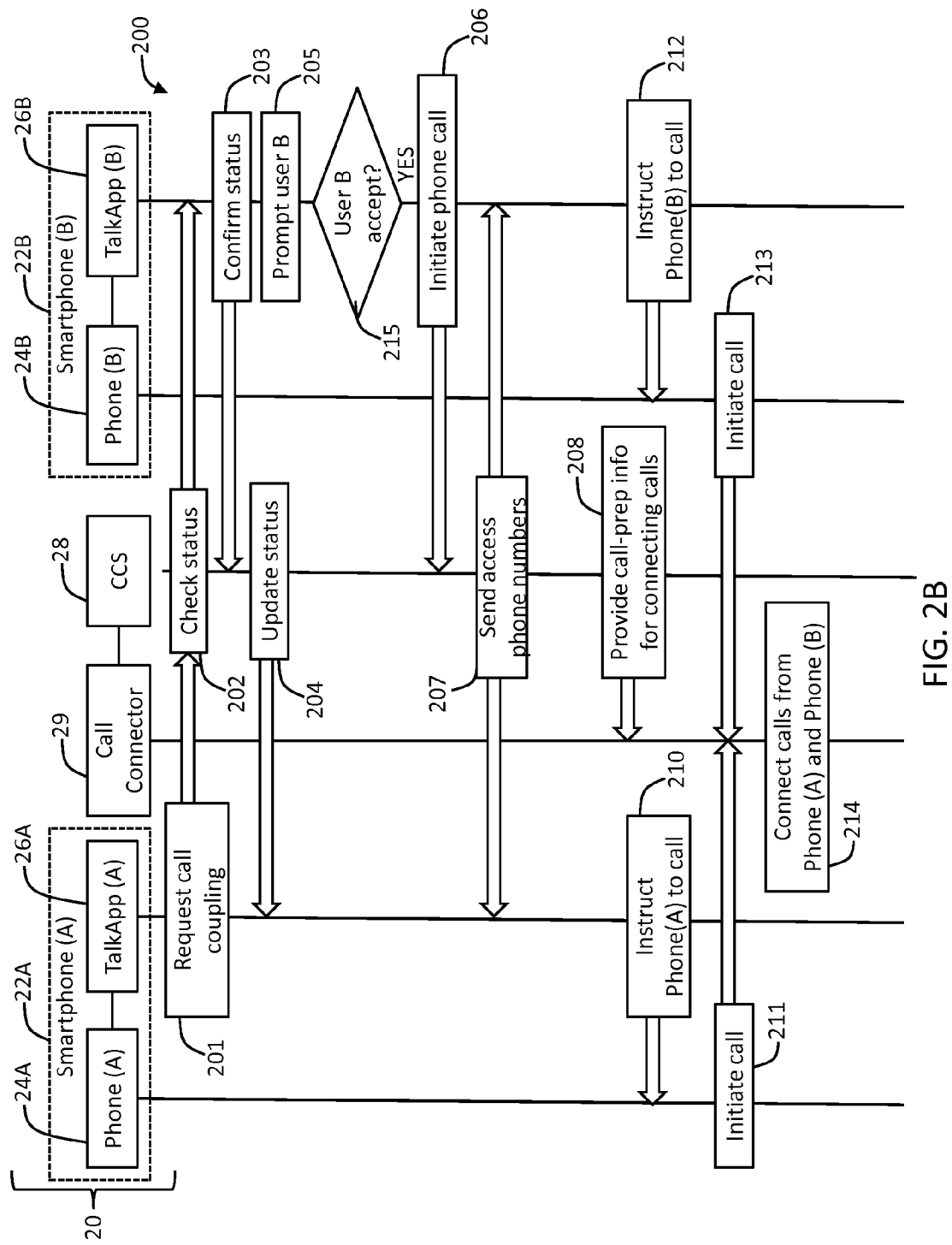
FIG. 2B shows a schematic flow diagram of an alternative call coupling procedure in accordance with an embodiment of the invention.

FIG. 2B shows a schematic flow diagram 200 of an alternative call coupling procedure provided by call coupling system 20 shown in FIGS. 1A and 1B, in accordance with an embodiment of the invention. As previously shown in FIG. 2A, Phone 24A, phone 24B, TalkApp 26A, TalkApp 26B, CCS 28 and call connector 29 are each appended with a vertical activity line along with their respective activities and statuses are indicated during performance of the call coupling procedure 200. In an embodiment of the invention, communication between TalkApp 26A, TalkApp 26B and CCS 28 is via an ACC (by way of example ACC 32 shown in FIGS. 1A and 1B).

In a block 201, user A (not shown) operates TalkApp 26A loaded on his or her smartphone 22A to request a phone connection with smartphone 22B operated by user B (now shown). The phone connection request, which comprises a phone number for smartphone 22B, is transmitted to CCS 28. The phone connection request optionally further comprises a phone number for smartphone 22A, and CCS 28 may save the phone numbers for phones 22A and 22B. In a block 202, in response to the request from TalkApp 26A, CCS 28 checks the status of TalkApp 26B to see if it stands ready to engage in call coupling procedure 200. In a block 203, if TalkApp 26B is ready to engage in call coupling procedure 200, a ready status is sent to CCS 28, and in a block 204, the ready state of TalkApp 26B is notified to TalkApp 26A. In a decision block 205, further in response to the status check 202 by CCS 28, TalkApp 26B controls smartphone 22B to prompt user B to accept the request. In a decision block 215, user B determines whether or not to accept the request from user A.

In a block 206, in response to User B's acceptance of User A's request, TalkApp 26B initiates a phone call procedure by instructing CCS 28 to, in a block 207, transmit access phone numbers to initiate phone calls to call connector 29 to both TalkApp 26A and TalkApp 26B. In an embodiment of the invention, the access phone numbers are selected by a price optimizing engine as described hereinabove that is comprised in CCS 28. In a block 208, further in response to TalkApp 26B instructing CCS 28 to initiate the phone call procedure, CCS 28 provides a call-prep info to call connector 29 so that call connector 29 will be able to connect phone calls received from phones 24A and 24B. In accordance with an embodiment of the invention, the call-prep message comprises phone 24A's call ID (A), phone 24B's call ID (B) and a notification that incoming phone calls terminating at call connector 29 corresponding to the respective call IDs for phone 24A and phone 24B are to be connected. Optionally, the call ID comprises a phone number of phone 24A and phone 24B. Optionally, the call ID comprises a phone number provided to phone 24A and/or 24B by a price optimizing engine.

In accordance with an embodiment of the invention, each of the phone calls initiated by phones 24A and 24B to call connector 29 is an in-network call. In certain embodiments of the invention, call connector 29 is subscribed to a different network operator than either of phones 24A and 24B, and the phone call from at least one of phones 24A and 24B optionally terminates at a CFU (not shown) that is subscribed to the same network as the phone, which then redirects the call to connector 29.

In accordance with an embodiment of the invention, each of a plurality of networks operators may have a CFU subscribed to it, which redirects incoming in-network phone calls to call connector 29, so that the call coupling procedure may be completed between smartphones 22A and 22B regardless of which network operator each smartphone participating in the call coupling procedure is subscribed to. As a consequence, even if the network operator of smartphone 22A and the network operator of smartphone 22B charges a termination fee for calls initiated from one network that terminates on the other network, smartphones 22A and 22B may circumvent the termination fee through exercising the call coupling procedure.

For example, smartphone 24A is subscribed to a first phone network operator 42A and smartphone 24B is subscribed to a second phone network operator 42B (FIG. 1B). A service plan that each smartphone operates under its respective network operator provides, for a flat monthly fee, allowing free unlimited in-network phone calls and free unlimited data through the ACC. However, each service plan also charges an additional per-call or per-minute fee for initiating out-of-network phone calls, in order to cover the termination fee that the two network operators charge to each other. Both smartphones 22A and 22B have respectively loaded TalkApps 26A and 26B, and both the first and second network operators 42A and 42B have connected, within their respective networks, one or more CFUs that can redirect in-network phone calls to call connector 29 that is subscribed with a third network operator. Therefore, by establishing a phone connection through the call coupling procedure using TalkApps 26A and 26B, smartphones 22A and 22B may establish a phone connection without initiating an out-of-network call and thus avoid being charged the additional out-of-network calling fee.

In response to receiving the access phone numbers, in blocks 210 and 212, each of TalkApps 26A and 26B instruct, respectively, phones 24A and 24B to initiate a phone call. In response to the respective instructions, in blocks 211 and 213, each of phones 24A and 24B initiates the phone call, using their respective access phone number, to call connector 29. In a block 214, call connector 29, in accordance with the call-prep message provided by CCS 28, then connects the phone calls to establish a phone connection between phones 24A and 24B.

It is noted that in the above description and the figures, CCS 28 may appear as a single centralized computer system. However, practice of the invention is not limited to CCS 28 being housed in a single computer or being located in a single location. CCS 28 for example may have a distributed configuration with code and hardware components located in different locations, for example in a distributed "cloud computer system". Alternatively, CCS 28 may be integrated and housed in an individual device. It is also noted that in the above description and in the figures call connector 29 may appear as a single centralized system. However, call connector 29 may optionally have a distributed configuration with code and hardware components located in different locations. It is also noted that in the above description and in the figures TalkApps 26A and 26B may appear to be entirely installed within smartphones 22A and 22B. However, TalkApps 26A and 26B may optionally be partially installed in smartphones 22A and 22B and partially installed in CCS 28. It is also noted that in the above description and in the figures CCS 28 and call connector 29 may appear as housed in separate devices. However, CCS 28 and call connector 29 may optionally be combined in an integrated device.

There is therefore provided in accordance with an embodiment of the invention a method for establishing for a first smartphone a phone connection with a second smartphone, each smartphone comprising a phone and running an app, the method comprising: exchanging, by operating the app, at least one permission message between the first and second smartphones; transmitting a first identifier from the first smartphone and a second identifier from the second smartphone to a call connector, responsive to a successful exchanging of the at least one permission message; and connecting a first phone call and a second phone call to establish a phone connection between the first and second smartphones, if the first phone call matches the first identifier and the second phone call matches the second identifier.

In an embodiment of the invention, the first and second phone calls terminate at the call connector.

In an embodiment of the invention, the at least one permission message is exchanged between the first and second smartphones, and/or the first and second identifiers are transmitted, through an auxiliary communication channel that operates through a non-voice communication protocol. Optionally, the non-voice communication protocol is selected from the group consisting of: an internet protocol, a USSD protocol and a SMS protocol.

In an embodiment of the invention, the successful exchanging of the at least one permission comprises: the first smartphone sending a connection request to the second smartphone; and the second smartphone sending an acknowledgement to the first smartphone, responsive to a user of the second smartphone accepting the connection request.

Optionally, the receiving of the connection request triggers the second smartphone to prompt a user of the second smartphone to accept the connection request.

Optionally, the first smartphone and the second smartphone each initiate a phone call to the call connector, responsive to a successful exchanging of the at least one permission message.

Optionally, the call connector is selected from a group consisting of: a private branch exchange (PBX) that receives a circuit-switched-network-based (CSN-based) phone call and an IP network server that receives a packet switched network-based (PSN-based) phone call.

In an embodiment of the invention, the first phone call and/or the second phone call is a call to a call forwarding unit (CFU) configured to forward the call to terminate at the call connector that is subscribed to a different network operator from the smartphone initiating the phone call.

Optionally, the CFU is subscribed to the same network operator as the first and/or second smartphone initiating the phone call.

Optionally, the CFU is a VoIP gateway that converts a CSN-based phone call received from the first and/or second smartphone into a VoIP call and forwards the call as a PSN-based phone call that terminates at an IP server serving as the call connector.

In an embodiment of the invention, the method further comprises selecting the CFU from a plurality of CFUs responsive to an expected cost of connecting the first and second phone calls through the CFU.

In an embodiment of the invention, the method further comprises selecting the call connector from a plurality of call connectors responsive to an expected cost of connecting the first and second phone calls through the call connector.

There is therefore provided in accordance with an embodiment of the invention a call coupling system comprising: a computer system operable to receive a first identifier from a first smartphone and a second identifier from a second smartphone; and a call connector operatively connected to the computer system and operable to: receive a first phone call and a second phone call; and establish a phone connection between the first smartphone and the second smartphone if the first phone call matches the first identifier indicating that the first phone call was initiated from the first smartphone and the second phone call matches the second identifier indicating that the second phone call was initiated from the second smartphone.

In an embodiment of the invention, the first and second phone calls terminate at the call connector.

In an embodiment of the invention, the first and second identifiers are transmitted, through an auxiliary communication channel that operates through a non-voice communication protocol. Optionally, the non-voice communication protocol is selected from the group consisting of: an internet protocol, a USSD protocol and a SMS protocol.

In an embodiment of the invention, the call connector is selected from a group consisting of: a private branch exchange (PBX) that receives a circuit-switched-network-based (CSN-based) phone call and an IP network server that receives a packet switched network-based (PSN-based) phone call In an embodiment of the invention, the call connector comprises a call forwarding unit (CFU) configured to forward the phone call to terminate at the call connector that is subscribed to a different network operator from the smartphone initiating the phone call.

In an embodiment of the invention, the CFU is a VoIP gateway that converts a CSN-based phone call received from the first and/or second smartphone into a VoIP call and forwards the call as a PSN-based phone call that terminates at an IP server serving as the call connector.

In an embodiment of the invention, the computer system comprises a price optimizing engine that selects the CFU from a plurality of CFUs responsive to an expected cost of connecting the first and second phone calls through the CFU. Optionally, the price optimizing engine selects the CFU so that the selected CFU is subscribed to the same network operator as the first and/or second smartphone initiating the phone call.

In an embodiment of the invention, the computer system comprises a price optimizing engine that selects the call connector from a plurality of call connectors responsive to an expected cost of connecting the first and second phone calls through the call connector.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method for establishing for a first smartphone a phone connection with a second smartphone, each smartphone comprising a phone and running a software application ("app"), the method comprising:
    exchanging, by operating the app, a request and an approval for establishing a phone connection between the first and second smartphones;
    transmitting a first identifier associated with the first smartphone and a second identifier associated with the second smartphone to a call connector, responsive to a successful exchanging of the request and approval;
    receiving a first phone call initiating from the first phone and terminating at the call connector and a second phone call initiating from the second phone and terminating at the call connector; and
    connecting the first phone call and the second phone call to establish a phone connection between the first and second phones, if the first phone call matches the first identifier and the second phone call matches the second identifier.

2. The method according to claim 1, wherein the request and the approval are exchanged between the first and second smartphones, and/or the first and second identifiers are transmitted, through an auxiliary communication channel that operates through a non-voice communication protocol.

3. The method according to claim 2, wherein the non-voice communication protocol is selected from the group consisting of: an internet protocol, a USSD protocol and a SMS protocol.

4. The method according to claim 1, wherein the receiving of the connection request triggers the second smartphone to prompt a user of the second smartphone to accept the connection request.

5. The method according to claim 1, wherein the call connector is selected from a group consisting of: a private branch exchange (PBX) that receives a circuit-switched-network-based (CSN-based) phone call and an IP network server that receives a packet switched network-based (PSN-based) phone call.

6. The method according to claim 1, wherein the first phone call and/or the second phone call is a call to a call forwarding unit (CFU) configured to forward the call to terminate at the call connector that is subscribed to a different network operator from the smartphone initiating the phone call.

7. The method according to claim 6, wherein the CFU is subscribed to the same network operator as the first and/or second smartphone initiating the phone call, the CFU being.

8. The method according to claim 6, wherein the CFU is a VoIP gateway that converts a CSN-based phone call received from the first and/or second smartphone into a VoIP call and forwards the call as a PSN-based phone call that terminates at an IP server serving as the call connector.

9. The method according to claim 6, further comprising selecting the CFU from a plurality of CFUs responsive to an expected cost of connecting the first and second phone calls through the CFU.

10. The method according to claim 1, further comprising selecting the call connector from a plurality of call connectors responsive to an expected cost of connecting the first and second phone calls through the call connector.

11. The method according to claim 1 further comprising:
    selecting a first access phone number configured to direct a phone call initiated from the first phone to terminate at the call connector and a second access phone number configured to direct a phone call initiated from the second phone to terminate at the call connector; and
    transmitting the first access phone number to the first phone and the second access phone number to the second phone.

12. The call coupling system according to claim 11, the computer system comprises a price optimizing engine configured to select first and second access phone numbers responsive to an expected cost of connecting the first and second phone calls.

13. A call coupling system comprising:
    a computer system operable to:
        receive a first identifier associated with a first phone and a second identifier associated with a second phone; and
    a call connector operatively connected to the computer system and operable to:
        receive a first phone call terminating at the call connector and a second phone call terminating at the connector; and
        establish a phone connection between the first phone and the second phone if the first phone call matches the first identifier indicating that the first phone call was initiated from the first phone and the second phone call matches the second identifier indicating that the second phone call was initiated from the second phone.

14. The call coupling system according to claim 13, wherein the first and second identifiers are transmitted, through an auxiliary communication channel that operates through a non-voice communication protocol.

15. The call coupling system according to claim 14, wherein the non-voice communication protocol is selected from the group consisting of: an internet protocol, a USSD protocol and a SMS protocol.

16. The call coupling system according to claim 13, wherein the call connector is selected from a group consisting of: a private branch exchange (PBX) that receives a circuit-switched-network-based (CSN-based) phone call and an IP network server that receives a packet switched network-based (PSN-based) phone call.

17. The call coupling system according to claim 13, further comprising a call forwarding unit (CFU) configured to forward the phone call to terminate at the call connector that is subscribed to a different network operator from the phone initiating the phone call.

18. The call coupling system according to claim 17, wherein the CFU is a VoIP gateway that converts a CSN-based phone call received from the first and/or second phone into a VoIP call and forwards the call as a PSN-based phone call that terminates at an IP server serving as the call connector.

19. The call coupling system according to claim 17, wherein the computer system comprises a price optimizing engine that selects the CFU from a plurality of CFUs responsive to an expected cost of connecting the first and second phone calls through the CFU.

20. The call coupling system according to claim 19, wherein the price optimizing engine selects the CFU so that the selected CFU is subscribed to the same network operator as the first and/or second phone initiating the phone call.

21. The call coupling system according to claim 13, wherein the computer system comprises a price optimizing engine that selects the call connector from a plurality of call connectors responsive to an expected cost of connecting the first and second phone calls through the call connector.

22. The call coupling system according to claim 13, wherein the computer system is operable to:
   select a first access phone number configured to direct a phone call initiated from the first phone to terminate at the call connector and a second access phone number configured to direct a phone call initiated from the second phone to terminate at the call connector; and
   transmit the first access phone number to the first phone and the second access phone number to the second phone.

23. The call coupling system according to claim 22, the computer system comprises a price optimizing engine configured to select first and second access phone numbers responsive to an expected cost of connecting the first and second phone calls.

* * * * *